United States Patent
Salemi (10) Patent No.: US 6,375,890 B1
(45) Date of Patent: Apr. 23, 2002

(54) MODIFIED PLASTIC BOTTLE INJECTION BLOW-MOLDING APPARATUS AND PROCESS

(75) Inventor: Tony Salemi, Ann Arbor, MI (US)

(73) Assignee: Brit Corporation, Ypsilanti, MI (US)

( * ) Notice: Subject to any disclaimer, the term of this patent is extended or adjusted under 35 U.S.C. 154(b) by 0 days.

(21) Appl. No.: 09/198,754

(22) Filed: Nov. 24, 1998

Related U.S. Application Data (60) Division of application No. 08/725,415, filed on Oct. 3, 1996, now Pat. No. 5,840,350, and a continuation of application No. 08/313,368, filed on Sep. 27, 1994, now abandoned.

(51) Int. Cl.$^7$ ............................................... B29C 49/48
(52) U.S. Cl. ...................... 264/523; 264/537; 249/102; 249/155; 249/156; 425/183; 425/185
(58) Field of Search .................. 264/523, 532, 264/537; 425/527, 529, 533, 183, 185, 190, 192 R; 249/102, 155, 156

(56) References Cited

U.S. PATENT DOCUMENTS

| | | | | |
|---|---|---|---|---|
| 3,347,965 A | * | 10/1967 | Valyi | 264/97 |
| 3,784,344 A | * | 1/1974 | Korsch | 425/387 |
| 4,330,248 A | * | 5/1982 | Platte | 425/183 |
| 5,255,889 A | * | 10/1993 | Collette et al. | 249/102 |
| 5,571,474 A | * | 11/1996 | Przytulla | 264/534 |

* cited by examiner

Primary Examiner—Suzanne E. McDowell
(74) Attorney, Agent, or Firm—James M. Deimen

(57) ABSTRACT

In an injection blow-molding process the preform is purposely formed as a smooth walled tube closed at one end and without any thread or other cap attachment configuration about the mouth of the preform. The preform is moved to the bottle mold which completely forms the cap attachment configuration with the bottle in the blow-molding step. A processing dome is also formed from the preform in the blow-molding step to provide means to transfer the bottle to the trimmer which removes the dome. By using the smooth walled preform (without threads or any other cap fastening features), the bottle mold may utilize only a portion of the vertical height of the preform for the bottle. Bottle molds for a variety of bottle volumes and heights may employ the same preform and preform injection mold. The smooth walled preform also permits bottle molds with a variety of mouth diameters to be employed with the same preform injection mold. Since the bottle mold provides the specific cap attachment configuration of the bottle such as threads or lugs, the same preform and preform injection mold may be employed for a variety of cap attachment configurations.

7 Claims, 6 Drawing Sheets

MODIFIED PLASTIC BOTTLE INJECTION BLOW-MOLDING APPARATUS AND PROCESS

This application is a divisional application of application Ser. No. 08/725,415, filed Oct. 3, 1996, now U.S. Pat. No. 5,840,350 issued Nov. 24, 1998, in turn a continuation of application Ser. No. 08/313,368, filed Sep. 27, 1994, and now abandoned.

BACKGROUND OF THE INVENTION

The field of the invention pertains to the manufacture of plastic bottles and, in particular, to the processes of injection blow-molding and injection, stretch and blow-molding wherein a bottle preform is first injection-molded and, as a second step, the preform is blow-molded to the bottle shape. Between the first and second steps, the preform may be stretched to the bottom of the bottle mold as an option for enhanced bottle material properties. This method is most commonly used for the manufacture of beverage bottles from polyethylene terepthalate (PET).

U.S. Pat. No. 4,603,831 discloses a process and apparatus for forming an injection-molded preform followed by transport of the preform to a bottle mold wherein the preform is blown into the bottle shape. U.S. Pat. No. 4,233,022 illustrates further the intermediate step of stretching the preform to the bottom of the bottle mold prior to blowing the preform to the bottle shape. The preform is stretched mechanically as shown.

U.S. Pat. No. 4,007,243 discloses the manufacture of bottles from a blown preform followed by a final blowing in a second final bottle mold. And, U.S. Pat. No. 3,940,231 discloses an intermediate step of thermal treatment of the preform before the final blowing step to form the bottle.

U.S. Pat. No. 3,271,489 discloses a blow pin and neck finishing apparatus for forming the externally threaded neck of a bottle. In this patent, the bottle is formed from an extruded parison directly enclosed by the bottle mold that forms the final bottle shape. Likewise, U.S. Pat. No. 3,769,394 is directed to the neck finishing of bottles blown from an extruded parison. The excess material above the threaded top of the bottle is sheared off as a part of the neck-finishing and thread-forming plunge of the apparatus into the parison trapped in the mold.

U.S. Pat. No. 4,382,769 discloses a neck finishing blow pin and a crammer sleeve about the blow pin to pack in the parison in forming the threaded top of the bottle. The crammer sleeve also acts to sever the parison above the top and remove the severed portion when the bottle molds subsequently open. U.S. Pat. No. 4,390,338 is similarly directed to finishing the neck and threaded top of the bottle. The blow pin effects compaction of the plastic in the neck and top. A rotation collar and cutter collar remove the excess plastic from the top of the bottle as a part of the finishing process.

In the past, applicant has developed and used a modular mold system for single-step extruded parison bottle manufacture. The bottle molds comprise a split stack of partial molds. For example, the bottle volume portion, the neck and top portion, the processing dome portion, spacers as needed, and at the top of the bottle mold, a blow pin funnel are stacked. The processing dome formed above a bottle by the mold provides a means to transport the bottle to the trimmer. By means of the modular system, the overall mold height is maintained, the dome, spacer and blow pin funnel portions are standardized, and a wide variety of bottle sizes, shapes, neck and top configurations can be interchanged. A new bottle shape or top thread or other configuration can be added by merely manufacturing only the new mold parts for the volume portion or the neck and top portion of the bottle. This modular system has substantially reduced the tooling cost and therefore the per bottle cost which makes feasible relatively short-run bottle manufacture.

With a view toward expanding the advantages obtained above in manufacturing one-step extrusion blow-molded bottles to the two-step injection blow-molded process and the three-step injection, stretch and blow-molded process, the applicant has invented the improvements disclosed below. Currently, in the injection step of both processes the injection mold forms the thread or other cap fastening means and the complete sealing surface about the bottle mouth as a part of the injected preform. After the preform is separated from the injection mold, the preform is placed in the bottle mold. The bottle mold grips the preform about the thread to protect the thread from distortion and seals the preform against leakage of blowing air with a slight interference fit just below the thread. Thus, the injection mold must be critically matched with the corresponding bottle mold. The interference fit at the neck below the thread which provides the air seal can cause distortion of the plastic at the neck directly affecting the appearance and usefulness of the bottle. A new thread or cap fastening means for a bottle requires a new injection mold in addition to a new bottle mold. Also, a new height bottle requires a new injection mold in addition to the new bottle mold.

Prior art injection blow molding can also require a different preform mold and bottle mold for materials differing in shrinkage rate. The possible requirement for a new injection mold as well as bottle mold also arises from the carryover of exact dimensions from the preform to the finished bottle, particularly with respect to the cap fastening means.

SUMMARY OF THE INVENTION

The invention is directed to further modifications of the injection blow-mold and injection, stretch and blow processes for plastic bottle manufacture. The invention comprises injection molding a preform lacking a thread or other cap retention means and bottle-sealing surface at the top of the preform. The preform is substantially cylindrically shaped with a smooth circular wall extending to the mouth opening. The end opposite the mouth is closed. The invention is equally applicable to other preform cross-sections such as oblong. The preform is transferred on the injection mold core to the bottle mold wherein the bottle is blown. In blowing the bottle, the cap retention means and dome are formed and the sealing surface (sealing land) is partially formed at the location that will become the top of the bottle. The invention is equally applicable to the injection, stretch and blow process, however, typically means other than the injection mold core are used to transfer the preform.

In blowing the bottle, the neck, thread or cap fastening means, sealing land and processing dome are blown to shape with the bottle. The bottle is then removed from the bottle mold and transferred to a trimming station wherein the processing dome is removed and recycled. The trimming knife finalizes the smooth sealing surface about the bottle mouth. Thus, with the new process the preform does not require a smooth sealing surface or land at the preform mouth in the previous injection molding step. Therefore, the injection step is less critical and the entire height of the preform need not be used to form the finished bottle.

The invention is specifically directed to relatively short-run bottle production but not limited thereto. The manufacturer who specializes in such production must be able to minimize tooling and mold cost to minimize bottle production cost. With the above smooth wall shaped preform, the same relatively simple and inexpensive injection mold can be used to mold a single size preform capable for manufacture of a wide variety of bottle heights, volumes, mouth diameters and threaded or otherwise configured necks and tops.

Only the preform outside diameter is relatively fixed for the entire panoply of bottle sizes, threaded tops and shapes. With a modular blow-mold system such as that previously developed for the extrusion blow-mold process by applicant but now applied to the bottle mold of the injection blow-mold and injection, stretch and blow-molding processes, the cost of the injection mold can be significantly cut compared to a conventional injection mold with a threaded top and sealing land. In the prior art, in contrast, multiple injection molds are required for differing thread design or bottle height.

Since the bottle mold must have a thread protective top section in a conventional injection blow-mold system, two complicated top sections are provided in the tooling, one for the threaded preform injection mold and the other to protect the preform threads in the blowing step. Moreover, in the neck region just below the thread the blow-mold must be carefully fitted to prevent air leakage during blowing. This fit can cause distortion of the plastic and such distortion can cause bottle rejects.

In contrast, with applicant's new system changing a threaded top design, size of bottle mouth or bottle height only requires the bottle mold have the new different thread configuration in the neck and top portion of the blow-mold. The preform injection mold need not be modified or removed. Moreover, the seal against air leakage during blowing is well above the sealing land of the bottle and therefore any distortion in the plastic at the air seal is subsequently removed from the bottle and recycled. Machine downtime for mold changeover is also decreased since only the bottle mold need be changed.

With applicant's new system the preform cooling time and overall cycle time for the machine can be reduced. In a conventional process cooling the injection mold formed threads of the cap fastening means is frequently the portion of the preform making process which requires the longest cooling time and sets the overall cycle time for the bottle-making process. With the smooth-walled preform of applicant's process, the preform cooling time is reduced, the overall cycle time is reduced and, as an added benefit, less plastic is used because the threads are blown and therefore have thinner plastic in the thread area of the finished bottle. A lighter bottle and savings in material cost are added benefits.

A further advantage results from the interchangeability of the bottle mold between injection blow-mold machines and extrusion blow-mold machines. Utilizing applicant's modular blow-mold system for extrusion blow-molding with minor modifications to the split bottle mold, such as to the spacer and grip pieces of the modular bottle mold, the bottle mold can be used on either type of machine.

In the detailed description below, further advantages and capabilities arising from the invention are disclosed.

DESCRIPTION OF THE PREFERRED EMBODIMENTS

Figure 1:
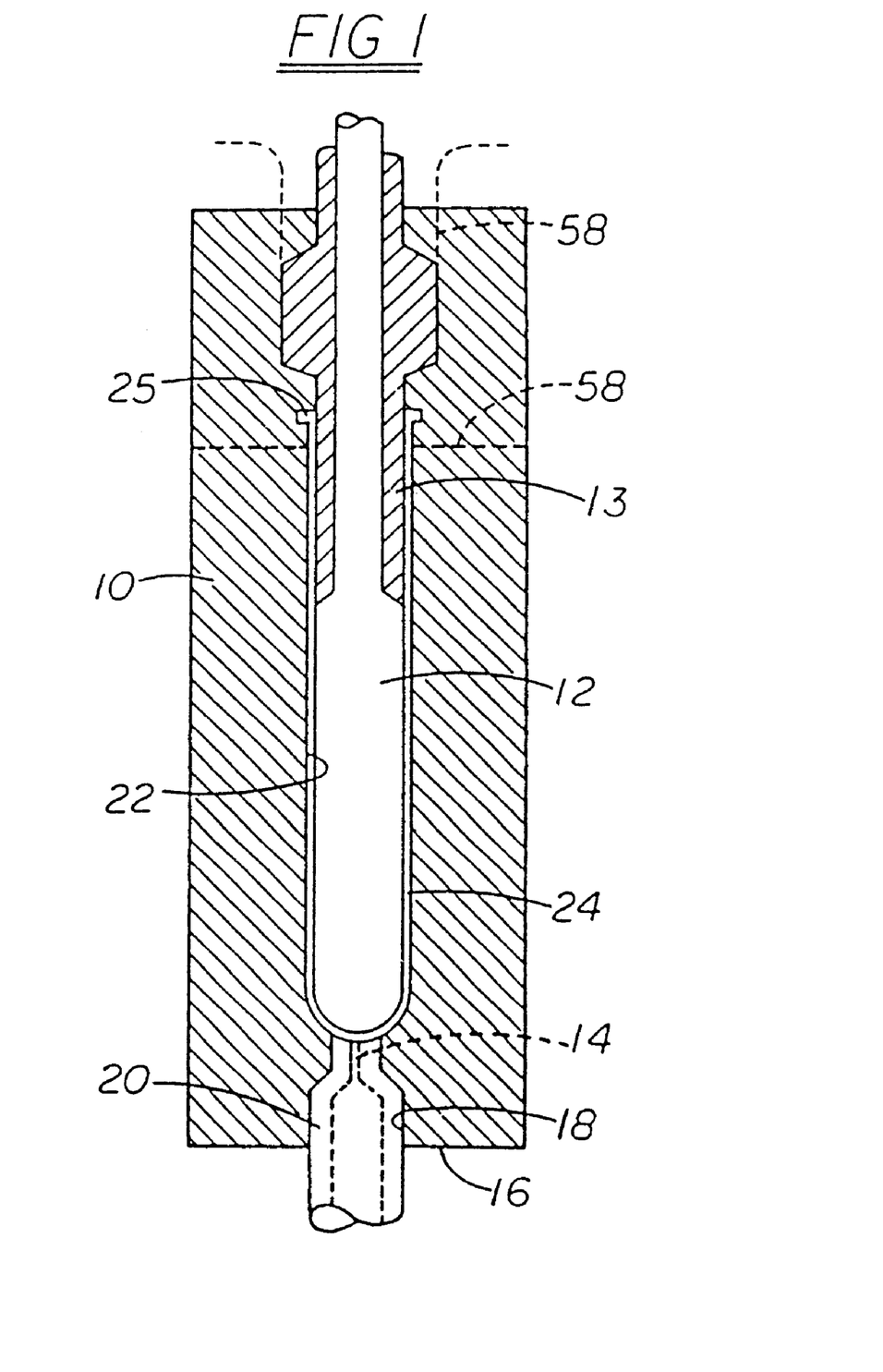
FIG. 1 illustrates in cross-section a new preform injection mold.

In FIG. 1, an injection mold 10 is shown schematically in cross-section. The mold 10 includes a two piece core 12, 13 extending into the mold from the top and an injection nozzle 20 with a gate 14 near the bottom 16 of the mold. Below the core 12 is a larger aperture 18 to accommodate the injection nozzle 20. Between the core 12, 13 and the mold 10 is a cavity 22 that is smooth walled tubular-shaped with a closed end at the nozzle 20. Thus, injection of plastic into the cavity 22 creates a preform 24 having a smooth exterior and interior surface. The wall thickness of the plastic preform 24 may be changed by merely changing to a core 12, 13 with a slightly different external diameter. The preform 24 may optionally include a small stripping lip 25 about the mouth. The mold 10 (whether a one piece or split mold) and core 12, 13 are simpler and less expensive to manufacture because no threads, lugs, bottle sealing surface or other configurations are incorporated in the preform 24 at the injection molding step.

Figure 2A:
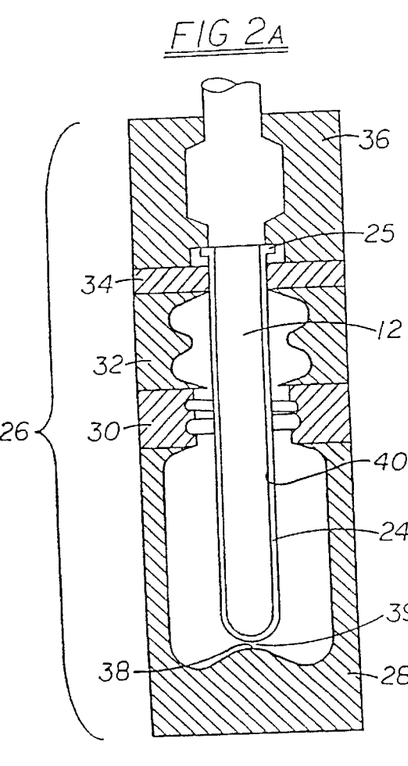
FIGS. 2a and 2b illustrate in cross-section the application for injection blow-molding of the new same size preform on a core placed inside a bottle mold for a large bottle and for a small bottle respectively.
Figure 2B:
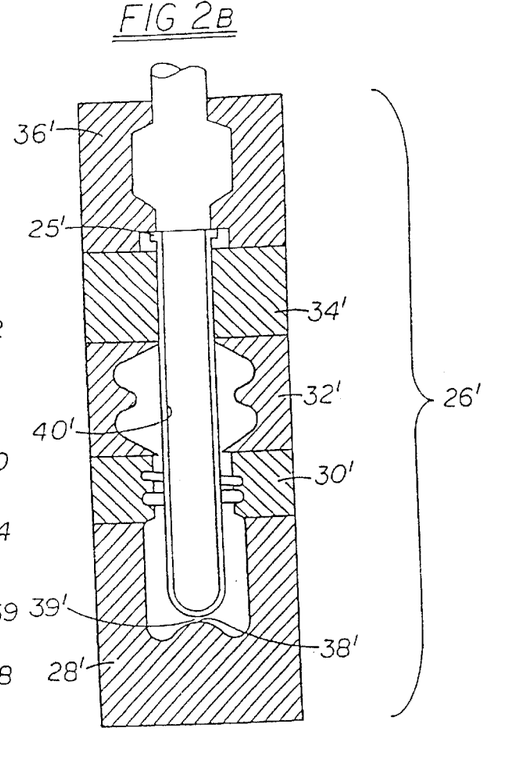

The core 12 with the preform 24 is released from the injection mold 10 and moved to the bottle mold 26 as shown in two configurations in FIGS. 2a and 2b. The bottle mold 26 comprises a stack of modular mold portions for each half-mold in the preferred mode, although a conventional mold one piece halves might be substituted for either configuration. The modular mold stack comprises the lower volumetric bottle portion 28, neck and top portion 30, which may include threads or lugs or other features to enable a cap to fasten to a bottle, a processing dome portion 32, a grip portion 34 to tightly engage the preform 24 against core 12, 13 and core centralizer 36. The grip portion 34 height is specified as needed to make the overall bottle mold height a standardized height. The corresponding portions in FIG. 2b are designated by primes.

The preform 24 on the core 12 extends almost to the bottom of the bottle mold cavity 38 maintaining a critical gap 39 as shown in either configuration of FIG. 2. Typically, the core 12 includes at least one orifice (not shown) for blowing the preform 24 to the bottle shape. The side-by-side comparison of FIG. 2a with FIG. 2b illustrates a relatively large bottle or a relatively small bottle and any size in between may be blown from the same preform 24. The lower volumetric bottle portion 28 and the neck and top portion 30 determine the entire bottle shape, cap fastening means and height. The height of the bottle determines the portion of the preform 24 that forms the bottle. The remaining portion of the preform 24 that forms the bottle processing dome 44 and is in the grip portion 34 and core centralizer 36 above the bottle processing dome 44 is subsequently trimmed from the bottle and recycled.

The preform 24 is tightly gripped by the grip portion 34 about the core 12 to form a seal against leakage of gas as the bottle is blown. However, since this seal is above the processing or transfer dome, distortion of the plastic is not critical and the future top of the bottle located in the mold below the dome is not affected by any distortion above the dome. Without concern for distortion of the bottle a better seal above the dome 44 can be achieved and cooling time decreased.

For all of the bottle configurations, the bottom 38 of the bottle mold cavity is closely adjacent the closed end of the preform 24. This provides for an even wall thickness around the bottle bottom. In addition, the bottle mouth within the neck and top portion 30 must be at least but preferably is larger than the preform 24 outside diameter. However, a range of bottle mouth diameters exceeding the preform inside diameter can be made.

Figure 3A:
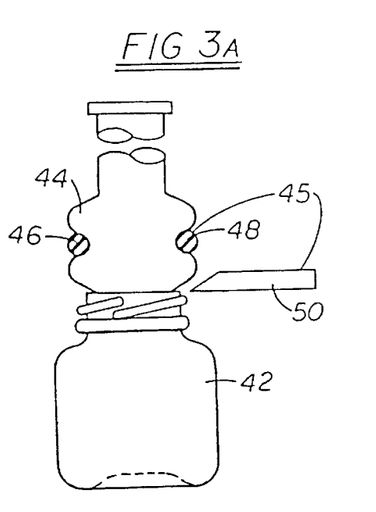
FIGS. 3a and 3b illustrate schematically a bottle and dome after ejection from the bottle mold and just prior to dome removal.
Figure 3B:
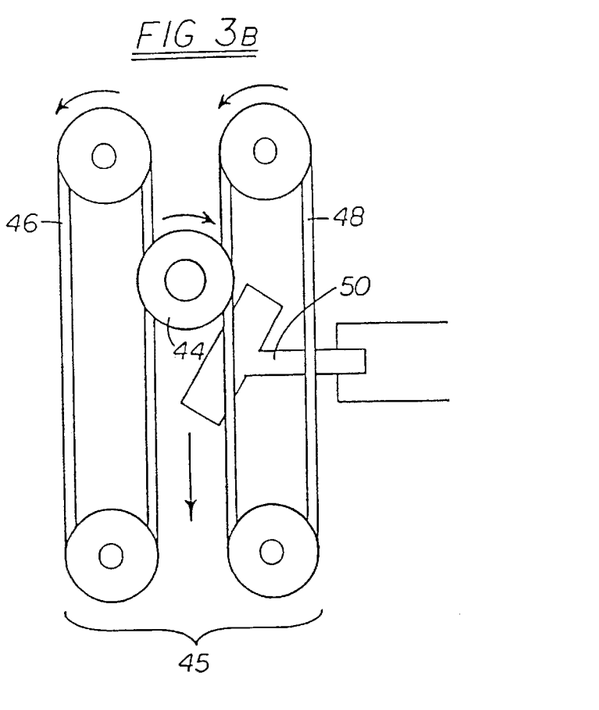

In blowing the preform 24 to bottle shape, the top of the bottle 42 and dome 44 are shaped by the configuration of the mold portions 30 and 32, respectively. As shown in FIGS. 3a and 3b, upon release of the newly formed bottle 42 from the blow mold 26, the bottle 42 is moved to a separate means to sever 45 the dome 44 from the bottle 42. The means to sever 45 comprises oppositely moving belts 46 and 48 which grip the dome 44 and spin the bottle 42 against a knife 50 to sever the dome 44 and plastic thereabove thereby finishing the bottle and finishing the sealing land at the mouth of the bottle. The means to sever 45 is here shown as the knife 50 and the oppositely moving belts 46 and 48, but other means such as a moving blade, or hot wire, could be advantageously employed. Since the sealing land is formed partially in the blow mold and finished by the knife 50, there are no critical sealing dimensions formed on the preform by the injection mold as distinguished from the prior art preform molds wherein critical dimensions for seals can cause premature mold wear and reject bottles. The severed dome 44 and plastic thereabove is reground for recycling.

By standardizing the overall height of the bottle mold 26, the height of the preform 24 is standardized at a height that in addition to the bottle height includes the dome portion 32, grip and spacer portion 34, and core centralizer 36. The preform injection mold 10 need not be changed for changes in bottle top configuration, mouth of bottle, bottle volume portion height or diameter. Only the core 12, 13 or portions of the core need be changed when or if required for changes in preform 24 wall thickness that are then reflected in changes of wall thickness for the final bottle.

With the same preform mold 10, a whole series of bottles differing in size, shape, mouth diameter, height, plastic material, top configuration and other parameters can be manufactured. The only limitations to bottle size are those imposed by the maximum external size of the bottle mold 26 (height and width) which controls maximum bottle height and diameter, respectively, and the preform mold cavity 22 height and diameter. The preform mold cavity 22 inside diameter controls the minimum mouth diameter of the entire bottle series. Within a subset of identical bottle heights, only the bottle mold volume portion 28 and top portion 30 need be tooled for a new bottle configuration. Materials of differing shrinkage rates do not require any change in preform mold because none of the dimensions of the preform carry over to the final bottle and therefore none of the dimensions of the preform are critical. Thus, the tooling cost and set-up time for relatively short-run production is minimized.

Figure 4A:
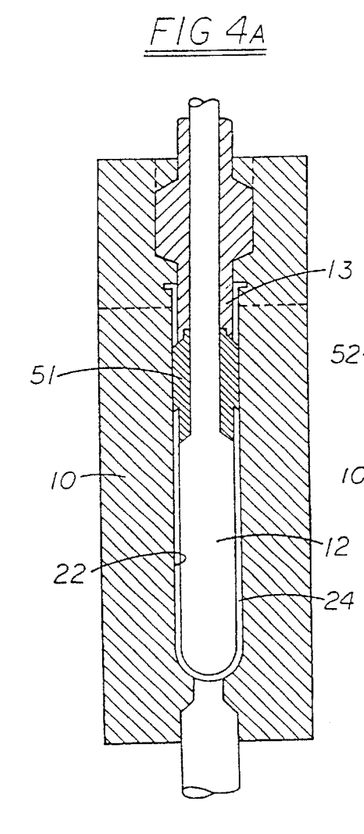
FIGS. 4a, 4b and 4c illustrate in cross-section modified cores or a spacer sleeve positioned on the core to foreshorten the preform injection mold.
Figures 4B, 4C:
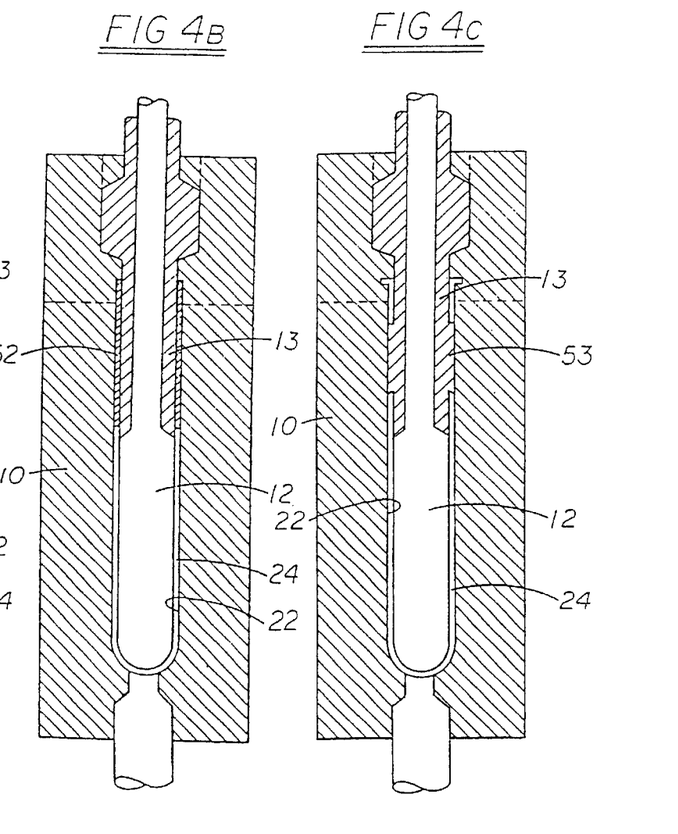

At times when only a lower segment of the preform is used to make a shorter bottle, in FIGS. 4a, 4b and 4c optional means for foreshortening, such as an enlarged three-piece core 51, cylindrical spacer sleeve 52 or enlarged two-piece core 53 can be positioned and retained on the core 12 in the preform injection mold 10. The enlarged cores 51 and 53 or sleeve 52 reduce the height of the preform 24 sealing off the cavity 22 and therefore reduce the amount of plastic recycled in the manufacture of relatively short bottles. Thus, in summary, regardless of bottle configuration, the bottom 38 of the bottle mold cavity is substantially fixed at the same elevation just below the bottom of the preform 24.

As is readily apparent a conventional extrusion blow mold (split bottle mold) can be used for the bottle mold of the new process. Only minor modifications to the mold such as changes in the air sealing location need be made. Moreover, these changes can be incorporated without preventing the mold from being returned for use on a single step extrusion blow mold machine. With applicant's modular bottle mold system only the spacer portion 36 and the grip portion 34 need be changed to move a modular bottle mold back and forth between an extrusion blow mold machine and an injection blow mold machine.

Figure 5A:
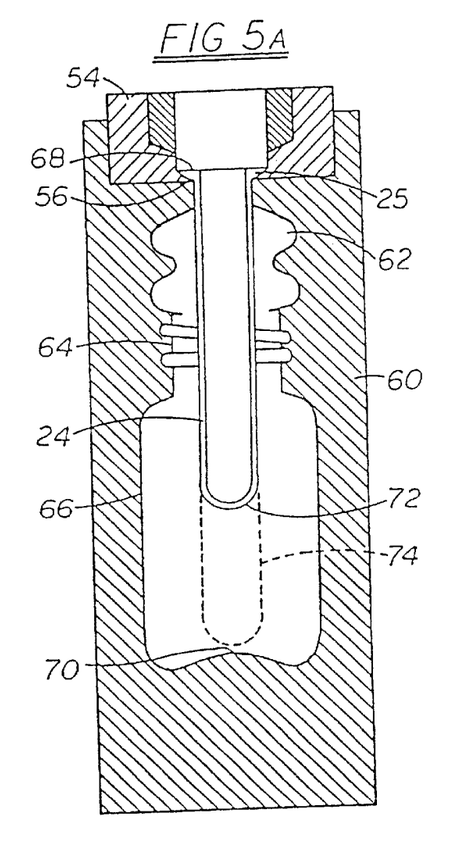
FIGS. 5a and 5b illustrate the application in cross-section of the new preform to a series of bottle sizes for the single machine injection, stretch and blow-molding process.
Figure 5B:
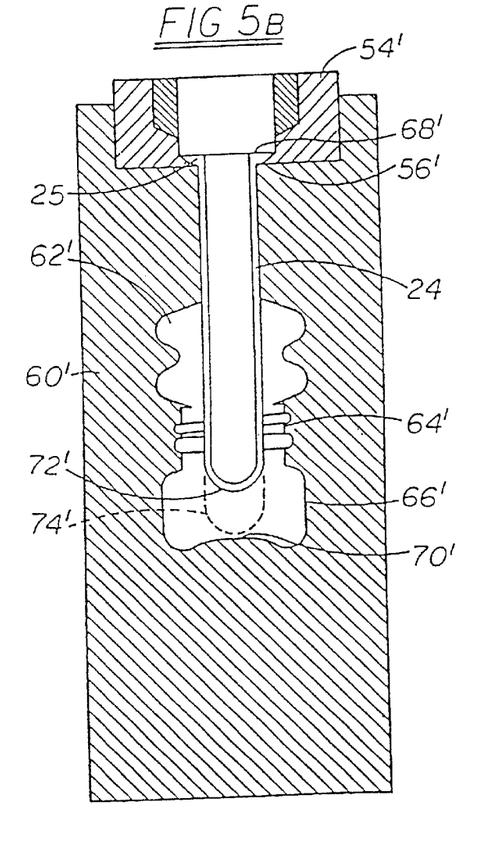

Further, and as illustrated in FIGS. 5a and 5b, a standardized preform 24 can be applied to the injection, stretch and blow-molding process. In this embodiment, the injection molding step and blow-molding step are both on the same machine; however, the preform 24 is transferred by an insert 54 having a lip 56 that supports the preform 24 by the preform lip 25. The core 12 is retracted from the preform 24 prior to preform transfer to the blow-mold 60. The insert 54 is both a part of the injection mold 10, as shown by the dashed lines 58 in FIG. 1 and the blow-mold 60 as shown in FIGS. 5a and 5b. Therefore, a set of molds, one for injection molding the preform 24 and one for stretching and blow molding the bottle 42, are used in combination. Other sets of molds are used to achieve other bottle configurations and sizes.

In FIG. 5a, a relatively large bottle mold 60 is illustrated. The mold 60 includes a dome portion 62, top and threaded portion 64 and volume portion 66. Above the lip 25 a plunger (not shown) is sized to fit tightly about the preform 24 mouth to form a seal at 68; however, any distortion of the plastic is not critical since the location is above the dome 62 and this portion of the blown bottle will be severed and recycled after the bottle is ejected from the mold 60.

As shown, the bottom 70 of the volume portion 66 is spaced below the bottom 72 of the preform 24 a substantial distance to allow for stretching of the preform as indicated by the dashed line 74. The preform 24 is stretched by a downward plunger inserted (not shown) in the preform until the bottom 72 of the preform is adjacent the bottom 70 of the volume portion 66. Thus, the maximum depth of the volume portion 66, below the standardized preform 24, is limited by the stretchability of the particular plastic material.

As shown in FIG. 5b, a considerably smaller bottle mold 60' is employed with the same preform 24. In this application, the dome portion 62' and the top and threaded portion 64' are located in the mold 60' at the lowest elevation practicable to permit the bottom 70' of the mold 60' to be spaced from the unstretched bottom 72' of the preform 24 as much as possible for the size of the bottle. Thus, the preform 24 may be stretched as indicated by the dashed line 74'.

FIGS. 5a and 5b illustrate the large and small extremes of bottles that can be formed using the standardized preform 24. In this embodiment, only the elevation of the insert 54 and lip 25 of the preform 24 remain constant regardless of bottle mold 60.

Figure 6A:
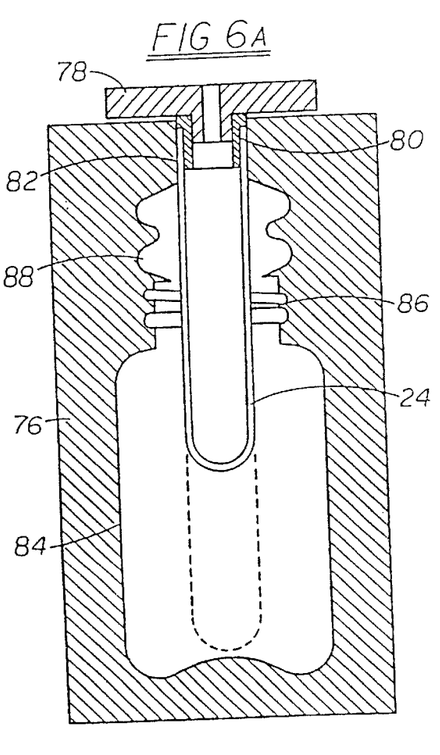
FIGS. 6a and 6b illustrate the application in cross-section of the new preform to a series of bottle sizes that can be stretched and blown with a single size of stored preform in a two machine alternative injection, stretch and blow-molding process.
Figure 6B:
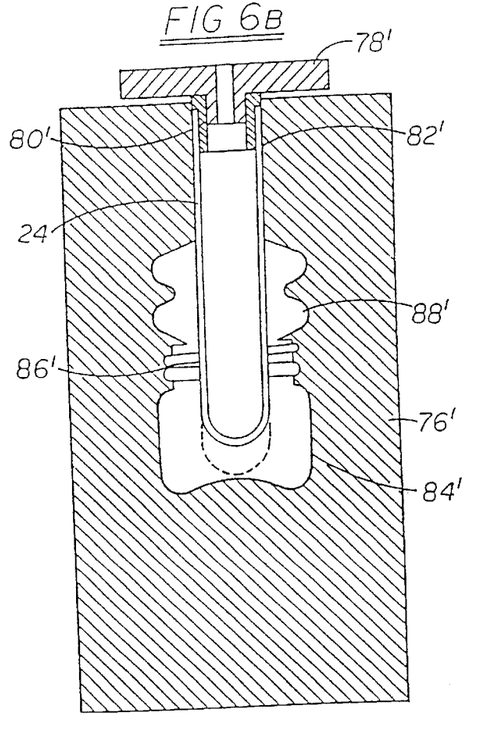

With reference to FIGS. 6a and 6b, the injection molding step to create the preform takes place on a separate machine from the stretching and blowing steps to create a bottle. In FIG. 6b, the corresponding portions to FIG. 6a are designated by primes. The preforms are stored at room temperature in inventory. With a variety of potential bottle configurations, currently a variety of preform configurations are stored as inventory awaiting orders for particular bottle configurations.

When the preforms are to be formed into bottles, the preforms are reheated to the proper temperature for stretching and blowing, whereupon the preforms are positioned in the bottle mold, stretched and blown.

In applying applicant's new preform 24, the need for a variety of preforms with cap fastening means in differing configurations is eliminated. The total number of preforms carried in inventory can be substantially reduced by use of applicant's new preform lacking cap fastening means.

The preform 24 is carried and positioned in the bottle mold 76 by carrier 78 having thereon a shaped collar 80 that is inserted into the mouth of the preform 24. The collar 80 may provide an interference fit with the mouth of the preform 24 to provide a tight grip on the preform while taking the preform through the reheating step and into the bottle mold 76. Once in the bottle mold 76, the bottle mold forms a seal 82 around the outside of the preform 24 adjacent the collar 80. As above, at the seal 82 distortion of the plastic is not critical to the final bottle because this portion of the preform 24 will eventually be severed from the bottle and recycled.

In this embodiment, the elevation of the gripping and sealing location 82 in the bottle mold 76 remains constant regardless of bottle configuration whether large 84 or small 84', top and thread configuration 86 or 86' and location of the processing dome 88 or 88'.

What is claimed is:

1. A method of injection blow molding a variety of bottle shapes from a single injection mold for molding a common preform for a blow mold, the blow mold having a fixed height and including a dome mold and a bottle mold, by selectably changing a height of the dome mold to be complementary to a height of the bottle mold in a modular system of plural blow molds having both dome molds and bottle molds, and wherein an injection mold height is foreshortened.

2. The method of claim 1 wherein the injection mold height is foreshortened by insertion of a sleeve therein.

3. The method of claim 1 wherein a bottle configuration is changed by exchanging at least a portion of a blow mold for another portion of a blow mold selected from the modular system.

4. The method of claim 1 wherein a bottle height is changed by exchanging a blow mold for a blow mold of changed bottle height and complementarily changed dome height whereby the overall height of the bottle and dome remain the same.

5. The method of claim 1 wherein the injection mold height is foreshortened by an enlarged three piece core.

6. The method of claim 1 wherein the injection mold height is foreshortened by an enlarged two piece core.

7. A method of injection blow molding a variety of bottle shapes, cap retention means and sealing lands from a single injection mold for molding a common preform for a blow mold, the blow mold having a fixed height and including a dome mold and a bottle mold, by selectably changing a height of the dome mold to be complementary to a height of the bottle mold in a modular system of plural blow molds having both dome molds and bottle molds.

* * * * *